Figure 1:
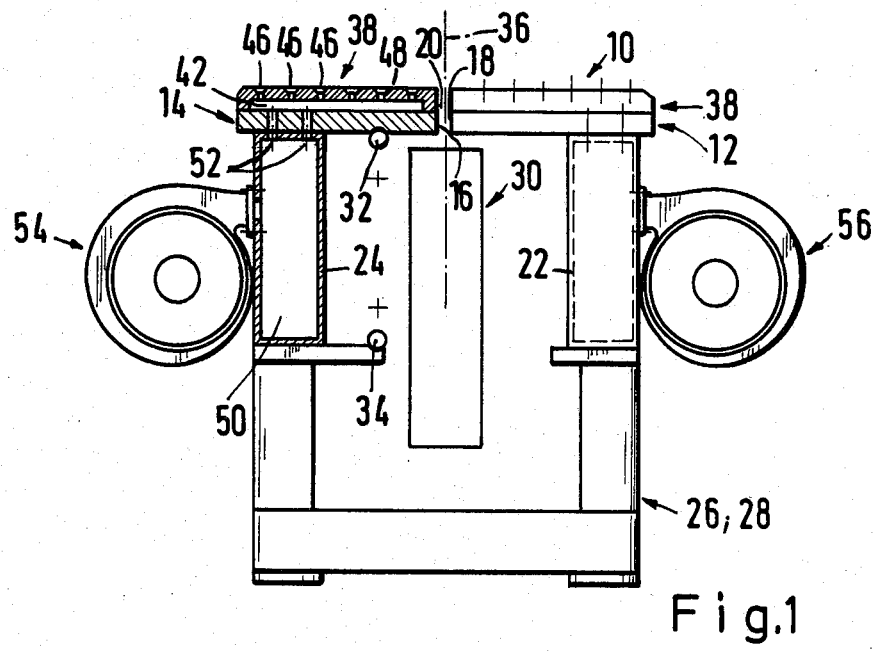

United States Patent [19]

Jenkner

[11] Patent Number: 4,644,833
[45] Date of Patent: Feb. 24, 1987

[54] WORKPIECE SUPPORTING TABLE FOR PANEL SAWS

[76] Inventor: Erwin Jenkner, Lindenstrasse 13, Gechingen, Fed. Rep. of Germany, D-7261

[21] Appl. No.: 789,106

[22] Filed: Oct. 18, 1985

[30] Foreign Application Priority Data

Oct. 31, 1984 [DE] Fed. Rep. of Germany ....... 3439739

[51] Int. Cl.$^4$ .............................................. B26D 7/01
[52] U.S. Cl. ......................................... 83/99; 83/168; 83/477.2; 83/648; 269/20; 269/295
[58] Field of Search ................... 83/402, 98, 99, 168, 83/169, 648, 477.2; 269/296–302, 295, 13, 20, 21

[56] References Cited

U.S. PATENT DOCUMENTS

| | | | |
|---|---|---|---|
| 1,434,675 | 11/1922 | Boone | 269/13 X |
| 3,076,366 | 2/1963 | Granstedt | 83/402 X |
| 4,516,612 | 5/1985 | Wiley | 83/477.2 X |

Primary Examiner—Frank T. Yost
Attorney, Agent, or Firm—Dick and Harris

[57] ABSTRACT

A workpiece supporting table for panel saws which ensures that during the splitting-up and formatting of workpieces, chip-type sawing residues penetrating between the table and a workpiece placed on it cannot scratch a sensitive workpiece surface resting on the table when the workpiece is moved into a new cutting position, is described. To this end, the workpiece supporting table is in the form of a grooved table whose ridge-type elevations each comprise at least one air outlet channel which exits at their upper horizontal surface and is connected to a compressed air source. Chips penetrating between the workpiece and the ridge-type elevations during the sawing are carried along and pulled down from their upper surface by the air flow issuing from the elevations, once the workpiece is released for adjustment into a new cutting position on the workpiece supporting table.

8 Claims, 3 Drawing Figures

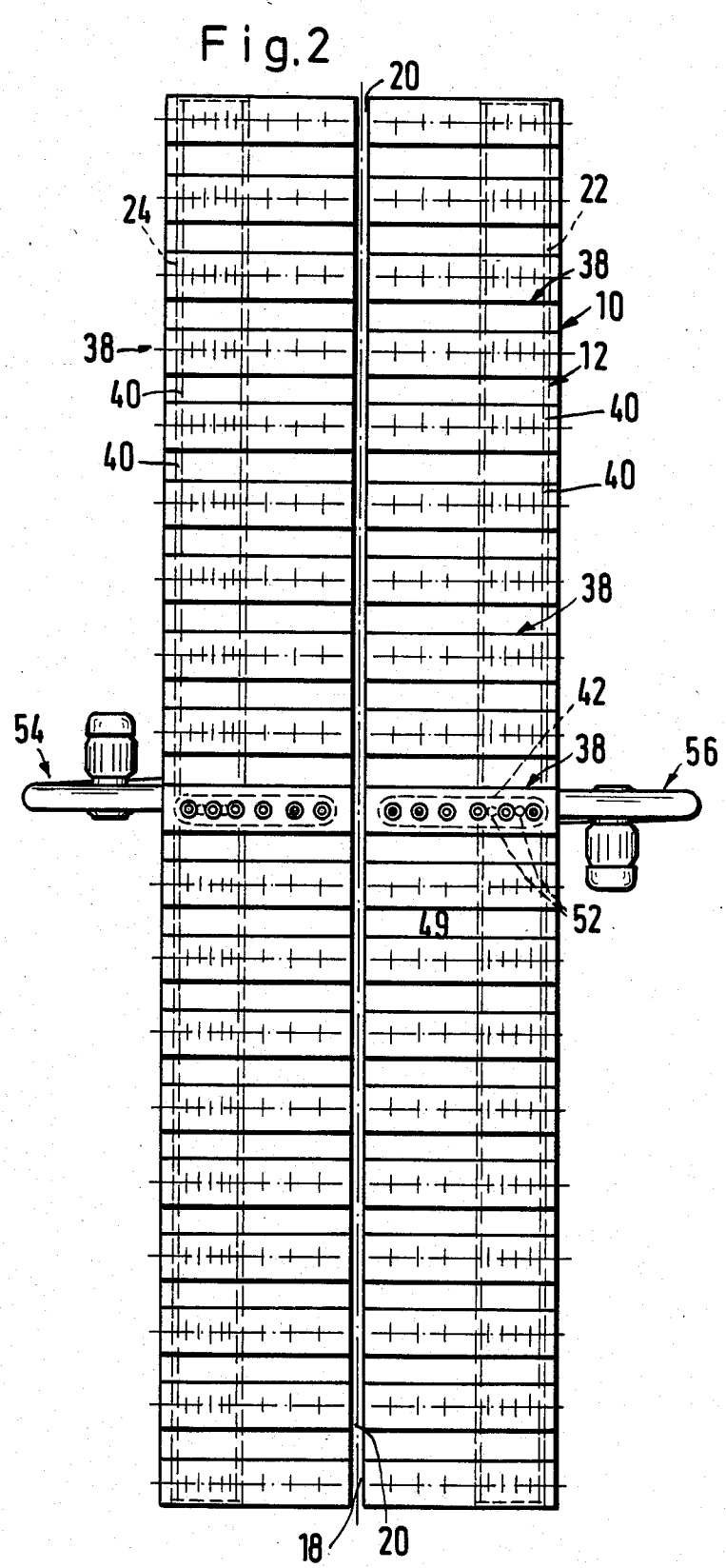

WORKPIECE SUPPORTING TABLE FOR PANEL SAWS

The invention relates to a workpiece supporting table for panel saws, with two box-shaped hollow supports arranged horizontally in laterally spaced parallel relationship to each other and carrying at the top one table plate each, arranged in a common horizontal plane and forming with their longitudinal edges located opposite each other a saw slit extending in the feed direction of a saw carriage guided beneath the table, with the profile interior of the hollow supports being connected to a blower and their table plate being penetrated by a plurality of bores running into the profile interior.

It is already known to equip panel saws with workpiece supporting tables of the above-described type, though the present invention differs substantially therefrom.

During the splitting-up and formatting of panel-type workpieces, compressed air may be pressed between the upper workpiece supporting surface and the panel-type workpieces to be machined resting on it by means of one blower or a blower connected to each of the profile interiors of the hollow supports via the bores arranged in the table plates of the hollow supports.

The air is used to oust chips which have penetrated into the space between the workpiece supporting surface and the workpiece during the sawing. The air and chips are blown out of this space in the direction of the saw slit once the workpiece has been released upon completion of the sawing. This is to prevent the occurrence of ridges upon and scratching of the workpieces caused by chips contacting sensitive surfaces of workpieces resting on the workpiece supporting surface, during displacement on the workpiece supporting table for readjustment for sawing cuts to be made. Otherwise such scratching of workpieces or creation of ridges thereon could render such workpieces unusable for their intended purpose.

Practice has, however, shown that the above-described use of compressed air alone is not adequate to keep the workpiece supporting surface free from chips in a satisfactory manner.

The object underlying the invention is, therefore, to indicate a workpiece supporting table of the kind described at the outset, wherein substantially perfect removal of chips penetrating between workpiece panels and workpiece supporting surfaces is ensured.

This object is attained in accordance with the invention in that the table plates of the hollow supports comprise on their upper side groove-type recesses arranged in spaced, parallel relationship to one another and extending perpendicularly to the saw slit, and in that only the ridges located between the recesses are each penetrated by at least one bore which exits at their upper horizontal surface and is connected to the corresponding profile interior.

The inventive workpiece supporting table is, therefore, in the form of a grooved table, whose workpiece supporting surfaces are formed by the horizontal upper flat sides of the ridges provided on the table plates.

During the splitting-up and formatting of a panel-type workpiece, chips penetrating between its lower workpiece surface and the ridges are carried along by the compressed air flowing out of the upper flat side of the ridges and flowing down between the ridges and the workpiece, upon release of the workpiece, out of the space formed by the ridges and the workpiece, and are deposited in the groove-type recesses located between the ridges.

On account of the relatively small ridge width and the high flow velocity of the compressed air resulting from the low height of the above-described gap-type space, the ridges are freed in a reliable manner from chip-type sawing residues coming to rest on them. Damage to sensitive workpiece surfaces of panel-type workpieces placed on the workpiece supporting table is, therefore, eliminated.

The ridge-type elevations on the table plate surface may be formed by milling corresponding groove-type recesses therein or also by arranging an attachment made, for example, of hard wood or plastic, on the table plates or directly on the hollow supports.

In a preferred embodiment of the invention, the ridges are in the form of strips placed onto the table plates. In this case, the table plates may be formed by the upper wall of the box profile of the hollow supports themselves or by further plates which may be placed, more particularly, in a removable manner, onto these.

In an embodiment of the invention which is particularly advantageous with respect to the manufacturing technique, the strips are provided on their lower side with a longitudinal groove which is closed before their end faces. In this case, at least one bore may be provided as air channel in the table plates beneath the longitudinal groove of each strip, and the groove bottom of each longitudinal strip groove may be penetrated by a plurality of bores arranged successively in one row and exiting in the upper flat ridge surface.

It is, therefore, adequate to provide in the upper profile wall of the hollow bodies only one or two bores per strip to ensure supply of the bores arranged in the strips with compressed air.

The strips may be manufactured particularly advantageously if they are in the form of molded plastic members.

The invention may also be advantageously realized in a workpiece supporting table whose table plates are held by profile supports instead of hollow bodies with a box profile. In this case, the ridges could be supplied with compressed air by a compressed air supply line common to the ridges of each table plate, and connectable in each case to the end face of the ridges remote from the saw slit, in order to supply a compressed air channel located in the ridges with compressed air.

Figure 3:
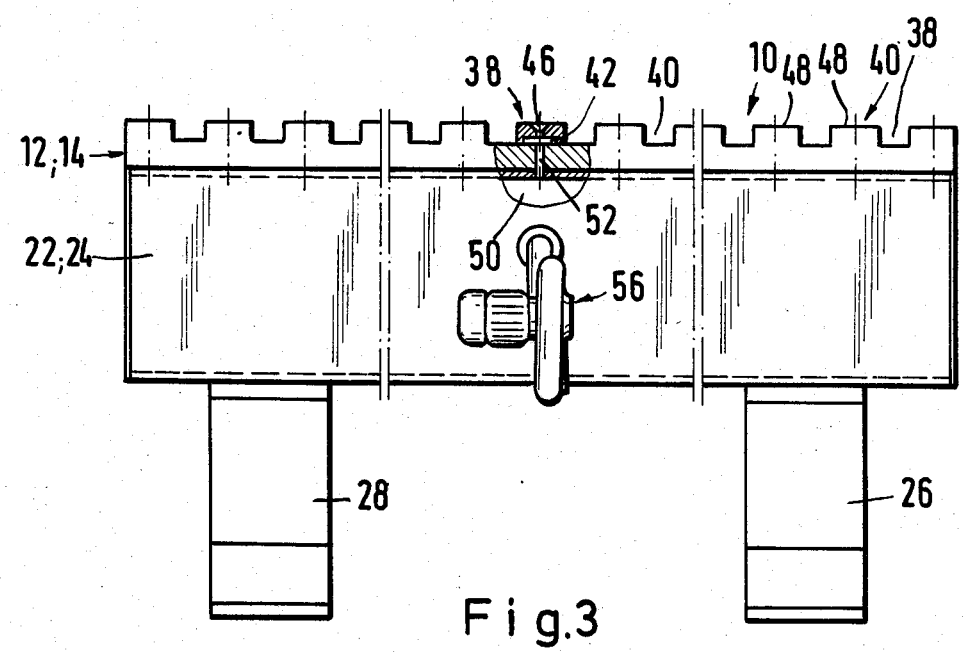

Further features and details of the invention are explained in the following description of an embodiment of an inventive workpiece supporting table shown in the drawings which illustrate schematically:

FIG. 1 a front end, partially cross-sectional view of the workpiece supporting table;

FIG. 2 a top view of the workpiece supporting table;

FIG. 3 a side view of the workpiece supporting table.

The workpiece supporting table designated in its entirety in the drawings by reference numeral 10 comprises two table plates 12 and 14 arranged in a common horizontal plane, which, with their longitudinal edges 16, 18 facing each other, define a saw slit 20 extending throughout the length of the workpiece supporting table 10.

Each table plate 12 and 14, respectively, is located on the upper side of an edge-wise arranged, hollow support 22 and 24, respectively, of rectangular cross-section, resting in their end area on common table feet 26 and 28.

As is apparent from FIG. 1, the hollow supports 22 and 24 are of comparatively narrow design, with the result that the table plates 12 and 14 protrude relatively far beyond these in the direction of the saw slit 20.

A saw carriage designated in its entirety by reference numeral 30 is displaceably guided beneath the table plates 12 and 14 and between the two hollow supports 22 and 24, along guides 32 and 34 arranged stationarily on the frame, and preferably in the form of cylindrical bars, throughout the length of the saw slit 20, and is driveable in alternating directions by means of a drive device which is not illustrated in greater detail. Its circular saw blade 36 emerges in the feed direction, as is apparent from FIG. 1, upwardly from the saw slit 20 to saw a panel-type workpiece placed onto the workpiece supporting table, and submerges again in a known manner, after completion of the sawing before the saw carriage 30 is returned to its initial position.

Arranged equidistantly with respect to time on the table plates 12 and 14 are supporting strips 38 in such a way that those of both table plates 12 and 14 are preferably flush with one another. Groove-type recesses 40 are, therefore, located between the supporting strips.

The supporting strips 38 comprise on their underside a longitudinal groove 42 extending in their longitudinal direction and terminating at a distance from their end faces. Arranged successively in a row in its groove bottom 44 are a plurality of air outlet channels 46 which exit from the upper flat strip surface 48.

The longitudinal groove 42 of the supporting strips 38 forms together with the upper surface of the table plates 12 and 14, respectively, an air guide channel which is connected to the profile interior 50 of the hollow supports 22 and 24, for example, via two air channels 52 arranged in the form of bores in the table plates 12 and 14. Connected to each hollow support 22 and 24, respectively, is a blower 54 and 56, respectively, with whose aid air is pressed into the profile interior 50 of the hollow supports 22 and 24, flows via the air channels 52 to the interior of the support strips 38 and escapes upwardly from these via the air outlet channels 46.

The table plates 12 and 14 might also be formed by the upper profile wall of the hollow supports 22 and 24 themselves.

Arranged above the workpiece supporting table, but for reasons of simplicity not illustrated, is a workpiece clamping device, with whose aid panel-type workpieces placed onto the supporting strips 38 may be clamped after their adjustment on the supporting strips 38.

During the sawing procedure, in spite of the clamping of a panel-type workpiece, chips are pressed in between its lower surface and the upper strip surface 48, which if they were to remain there, would scratch the sensitive lower surface of the workpiece panel after its release and during its displacement into a new cutting position. This is avoided in the table construction according to the invention, in that compressed air advantageously flows over the entire length of the supporting strips out of their upper strip surface 48, and when the clamping pressure on a workpiece panel is released, raises it slightly in the strip area and blows chips which have penetrated between the strip surface 48 and the workpiece panel down from the strip surface 48.

In this way, removal of sawing residues from the upper side of the supporting strips 38 is ensured before a panel-type workpiece is moved into a new sawing position on the workpiece supporting table.

The sawing residues are collected in the groove-type recesses 40 between the supporting strips 38.

The supporting strips 38 are preferably in the form of molded plastic members in which both the longitudinal groove 42 and the air outlet channels 46 may be formed during their manufacture.

What is claimed is:

1. Workpiece supporting table for panel saws, with two box-shaped hollow supports arranged horizontally in laterally spaced parallel relationship to each other and carrying at the top one table plate each, arranged in a common horizontal plane and forming with their longitudinal edges located opposite each other a saw slit extending in the feed direction of a saw carriage guided beneath the table, with the profile interior of the hollow supports being connected to a blower and their table plate being penetrated by a plurality of bores running into the profile interior, characterized in that the table plates (12; 14) of the hollow supports (22; 24) comprise on their upper side groove-type recesses (40) arranged in spaced, parallel relationship to one another and extending perpendicularly to the saw slit (20), and in that only the ridges (38) located between the recesses (40) are each penetrated by at least one air outlet channel (46) which exits at their upper horizontal surface (48) and is connected to the corresponding profile interior (50).

2. Workpiece supporting table according to claim 1, characterized in that the ridges (38) are in the form of strips set onto the table plates (12; 14).

3. Workpiece supporting table according to claim 2, characterized in that the strips (38) comprise on their lower side a longitudinal groove (42) closed before their end faces, and in that at least one bore (52) is arranged as connecting channel in the table plates (12; 14) beneath the longitudinal groove (42) of each strip (38), and the groove bottom (44) of each longitudinal strip groove (42) is penetrated by a plurality of air outlet channels (46) arranged successively in one row.

4. Workpiece supporting table according to claims 2 or 3, characterized in that the strips (38) are in the form of molded plastic members.

5. Workpiece supporting table for panel saws, whose supporting table surface comprises:
groove-type recesses extending perpendicularly to a saw slit arranged in the table,
ridge-type elevations (38) located between said groove-type recesses (40);
an upper flat workpiece supporting surface (48) comprised of said ridge-type elevations;
said ridge-type elevations comprising at least one air outlet channel (46) which exits through upper flat workpiece supporting surface (48); and
a compressed air source operably connectable to said air outlet channel.

6. Workpiece supporting table according to claim 5 further comprising:
two table plates arranged in a common horizontal plane proximate the top of said table; and
said ridge-type elevations (38) comprising one or more strips set onto said table plates (12 and 14).

7. Workpiece supporting table according to claim 6 wherein said strips further comprise:
a longitudinal groove (42) formed on the lower side of said strips and being closed before the end faces of said strips;

at least one bore (52) arranged as a connecting channel in said table plates (12 and 14) beneath said longitudinal groove (42) of each strip (38); and a plurality of air outlet channels (46) arranged successively in one row penetrating said groove bottom (44) of each longitudinal strip groove (42).

8. Workpiece supporting table according to claim 6 wherein said strips (38) comprise molded plastic members.

* * * * *